US007167098B2

(12) United States Patent
Siber et al.

(10) Patent No.: US 7,167,098 B2
(45) Date of Patent: Jan. 23, 2007

(54) TESTING EQUIPMENT FOR A FIRE ALARM

(75) Inventors: Bernd Siber, Glonn (DE); Ulrich Oppelt, Zorneding (DE)

(73) Assignee: Robert Bosch GmbH, Stuttgart (DE)

(*) Notice: Subject to any disclaimer, the term of this patent is extended or adjusted under 35 U.S.C. 154(b) by 209 days.

(21) Appl. No.: 10/990,172

(22) Filed: Nov. 16, 2004

(65) Prior Publication Data

US 2005/0110631 A1 May 26, 2005

(30) Foreign Application Priority Data

Nov. 18, 2003 (DE) ................................ 103 53 837

(51) Int. Cl.
*G08B 17/00* (2006.01)
*G08B 29/00* (2006.01)
*G01N 21/00* (2006.01)
*G01N 27/00* (2006.01)

(52) U.S. Cl. ...................... 340/628; 340/514; 340/515; 340/629; 340/630; 340/631; 340/632; 73/1.02; 73/1.03; 73/1.04; 73/1.05; 73/1.06; 73/1.07

(58) Field of Classification Search ........ 340/514–515, 340/628, 629, 630, 631, 632; 73/1.02, 1.03, 73/1.05, 1.06

See application file for complete search history.

(56) References Cited

U.S. PATENT DOCUMENTS

| | | | | |
|---|---|---|---|---|
| 4,374,329 | A | 2/1983 | Schoenfelder et al. | |
| 4,827,244 | A * | 5/1989 | Bellavia et al. | 340/514 |
| 5,170,150 | A | 12/1992 | Austin et al. | |
| 5,497,144 | A * | 3/1996 | Schappi et al. | 340/630 |
| 5,523,744 | A * | 6/1996 | Wieser | 340/630 |
| 5,670,946 | A * | 9/1997 | Ellwood et al. | 340/628 |
| 6,198,399 | B1 * | 3/2001 | Mattis | 340/628 |
| 6,769,285 | B2 * | 8/2004 | Schneider et al. | 73/1.06 |
| 2002/0021224 | A1 | 2/2002 | Schneider et al. | |

FOREIGN PATENT DOCUMENTS

| | | |
|---|---|---|
| DE | 100 47 194 | 3/2002 |
| JP | 6 840 78 | 3/1994 |

* cited by examiner

*Primary Examiner*—Daniel Wu
*Assistant Examiner*—Lam Pham
(74) *Attorney, Agent, or Firm*—Kenyon & Kenyon LLP

(57) ABSTRACT

The present invention relates to testing equipment 20 for a fire alarm 1. It includes a testing pole (21), a range spacer (23) connected to the testing pole (21), and a reflective means and/or scattering means situated in the inside of the essentially pot-shaped designed range spacer (23).

19 Claims, 3 Drawing Sheets

TESTING EQUIPMENT FOR A FIRE ALARM

BACKGROUND OF THE INVENTION

1. Field of the Invention

The invention relates to a testing equipment for fire alarms comprising a testing pole, a range spacer connected to the testing pole, and a reflection means and scattering means situated in the inside of the essentially pot-shaped designed range spacer.

2. Description of Related Art

Fire alarms have to be tested at periodic intervals for their operability. In Germany, for example, every fire alarm has to be tested at least once per annum according to Regulation VDE 0833.

A so-called stray light fire alarm usually includes a radiation emitter and a radiation receptor which are situated in such a way that no radiation is able to reach the radiation receptor directly from the radiation emitter. Radiation emitters and radiation receptors are rather situated in such a way that the radiation cone, that starts from the radiation emitter, and the space region, in which the radiation receptor reacts sensitively to the radiation, intersect. If smoke particles get into this intersection region that is also known as a scattering volume, the radiation coming from the radiation emitter is scattered by the smoke particles, and a part of the scattered radiation thus reaches the radiation receptor. The quantity of scattered radiation that reaches the radiation receptor at a given brightness of the radiation emitter depends on the nature of the smoke (smoke particle size, color of the smoke), the wavelength of the radiation used and the angle of scattering (the angle between the optical axis of the radiation emitter and the optical axis of the radiation receptor). The radiation emitter is usually controlled by a microcontroller. The radiation receptor is connected to amplifying electronics. The amplified scattered light signal is able to be read in by a microcontroller via an A/D converter and evaluated. If the scattered light signal exceeds a certain threshold, the fire alarm is triggered. This alarm is passed along via a bus system to a fire alarm center, from where the fire fighters are then alarmed. In order to exclude interference in the measuring device by ambient light, in current fire alarms, radiation emitters and receivers are surrounded by a cover which does let smoke particles through, but excludes light. Because of the shape of such covers, they are called a “labyrinth” in everyday conversation. The sensitivity of such scattered light measuring devices is great, so that, with respect to the labyrinth covers, one has to take care that no stray light impinges upon the receiver, by reflection from the chamber walls. The constructive formation of such covers is correspondingly complex. The smoke entry openings of labyrinths are usually provided with a screen, so as to prevent insects from penetrating into the measuring chamber and causing interference signals. In current scattered light fire alarms, the operability of the scattered light sensor is checked by generating artificial smoke to which the fire alarm then responds with an alarm. Artificial smoke is usually generated by atomizing a substance in an atomizer into very small droplets (aerosol), which act on the fire alarm like smoke. What is disadvantageous in this method is that, after the testing, the aerosol frequently does not disappear completely without leaving a residue, but rather deposits as a film on the fire alarm housing or in the fire alarm itself. In connection with dust, this can then lead to an undesirable dirtying of the fire alarm which impairs its operating safety. A further disadvantage of this testing method is that the concentration of the test aerosol is controllable only with great difficulty. Therefore, in general, such a high concentration of test aerosol is liberated that the fire alarm emits an alarm with certainty, inasmuch as it is still operable at all. Therefore, using this method, it is not possible to measure somewhat exactly the sensitivity to making a response. This frequently leads to the result that fire alarms which are just still operable, but which, based on aging effects or as a result of pollution have a response sensitivity that is much too low, are not recognized as being faulty. In case of a fire, however, an alarm is triggered by these fire alarms much too late, since they do not respond in time to a low smoke gas concentration. Fire alarms are also known in which several sensor principles are combined. In an optic-thermal fire alarm, the detection of the combustion gas is combined with a temperature measurement in order to detect a fire. In addition, gas sensors that detect fire gases may be installed in a fire alarm, and combined with the smoke sensor and/or temperature sensor. In the case of a combined fire alarm, the operability of each individual sensor has to be checked. This may be done by testing the individual sensors one after the other, this having the disadvantage that in this method the testing time and therewith the testing expenditure greatly increase with the number of individual sensors to be tested. However, besides the acquisition costs, the testing and the maintenance expenditures are important criteria in selecting a certain type of fire alarm. This has the disadvantageous result that the greater part of installed fire alarms are equipped with only one sensor, although fire alarms equipped with several sensors give better performance, and particularly have a lower rate of false alarms.

Another possibility of testing combined fire alarms is to use a testing unit in which all the sensors that are contained in the fire alarm are addressed at the same time. Such testing units are known from US 20902/0021224 A1 or DE 100 47 194 C1.

SUMMARY OF THE INVENTION

It is an object of the invention to make possible a reliable and cost-effective testing of fire alarms, particularly of fire alarms mounted flush with the ceiling, that are equipped with a scattered light sensor. These and other objects of the invention are achieved by testing equipment for fire alarms comprising a testing pole, a range spacer connected to the testing pole, and a reflection means and scattering means situated in the inside of the essentially pot-shaped designed range spacer.

In this context, one is not able to perform just one simple functional test. Rather, the testing equipment even makes possible an accurate measurement of the response sensitivity of a fire alarm that has been checked in that, for example, the distance of a scattering element of the testing equipment from the scattering volume of the fire alarm is able to be adjusted by a range spacer variable as to its height. In another embodiment variant of the testing equipment, the response sensitivity may be measured by easily exchangeable damping means which, with the aid of the testing equipment, are introduced into the beam path between the radiation emitter and the radiation receptor of the fire alarm. Because embodiment variants of the testing equipment include reflection means and scattering means having specified reflective properties and scattering properties, reproducible measurements are possible. In combination with a reservoir that contains test gas, using the testing equipment, one is able to test not only the scattered light sensor but simultaneously also the gas sensor of a combined scattered light/combustion gas alarm. By furnishing it with a magnet, a switchover of a fire alarm to a testing mode is simplified. Additional advantages are derived from the specification and the attached figures.

BRIEF DESCRIPTION OF THE DRAWINGS

The present invention will be described in greater detail with reference to the following drawings wherein.

DETAILED DESCRIPTION OF THE INVENTION

Figure 1:
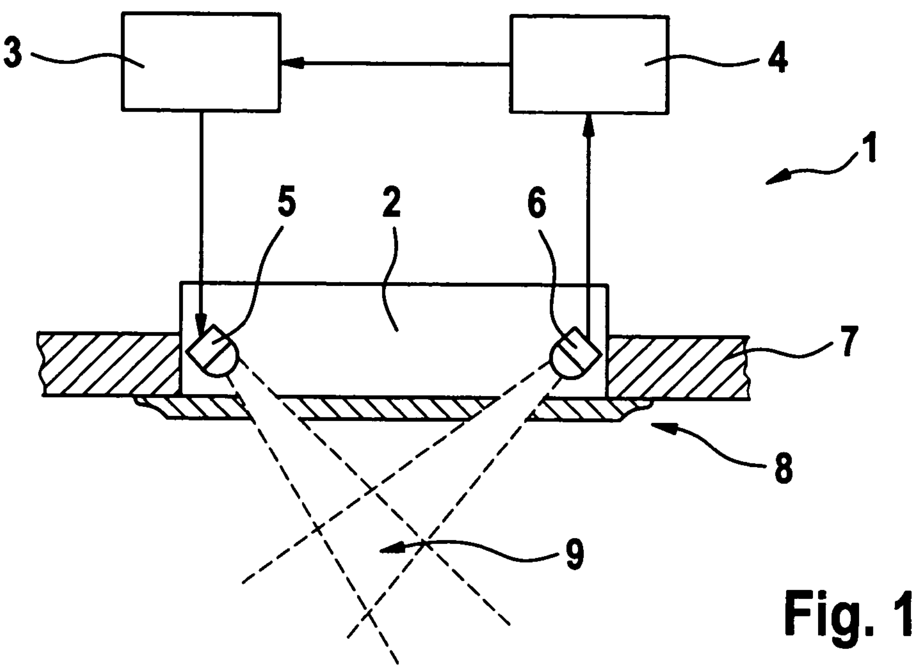
FIG. 1 shows the design principle of a fire alarm having a scattered light sensor.

In FIG. 1 a known fire alarm 1 is shown, which is based on a scattered light principle. Such a fire alarm 1 usually includes a radiation emitter 5, especially a light emitting diode (LED) and a radiation receptor 6, especially a photodiode (PD). Radiation emitter 5 and radiation receptor 6 are positioned in such a way that no radiation is able to reach radiation receptor 6 directly from radiation emitter. Radiation emitters 5 and radiation receptors 6 are rather situated in such a way that the radiation cone, that starts from radiation emitter 5, and the space region, in which radiation receptor 6 reacts sensitively to the radiation, intersect. If scattering elements, such as smoke particles of a combustion gas, get into this intersection region known also a scattering volume 9, then, at the smoke particles, the radiation proceeding from radiation emitter 5 is scattered, and a part of the scattered radiation arrives in that fashion at radiation receptor 6. The quantity of scattered radiation which arrives at radiation receptor 6 at any given brightness is a function of the nature of the smoke (smoke particle size, color of the smoke), the wavelength of the radiation used and the angle of scattering (the angle between the optical axis of radiation emitter 5 and the optical axis of radiation receptor 6). Radiation emitter 5 is usually controlled by a microcontroller 3. Radiation receptor 6 is connected to an electronic switching system 4, which includes at least one filter and one amplifier. Electronic switching system 4 is connected to microcomputer 3. The amplified scattered light signal is able to be read in by microcomputer 3 via an A/D converter and evaluated. If the scattered light signal exceeds a certain threshold, fire alarm 1 triggers an alarm. This alarm is passed along via a bus system, not shown in the drawing, to a fire alarm center, from where, for instance, the fire fighters are then alarmed. In order to exclude interference in the measuring device by ambient light, in current fire alarms, radiation emitters and receptors are surrounded by a cover which does let smoke particles through, but excludes light.

Figure 2:
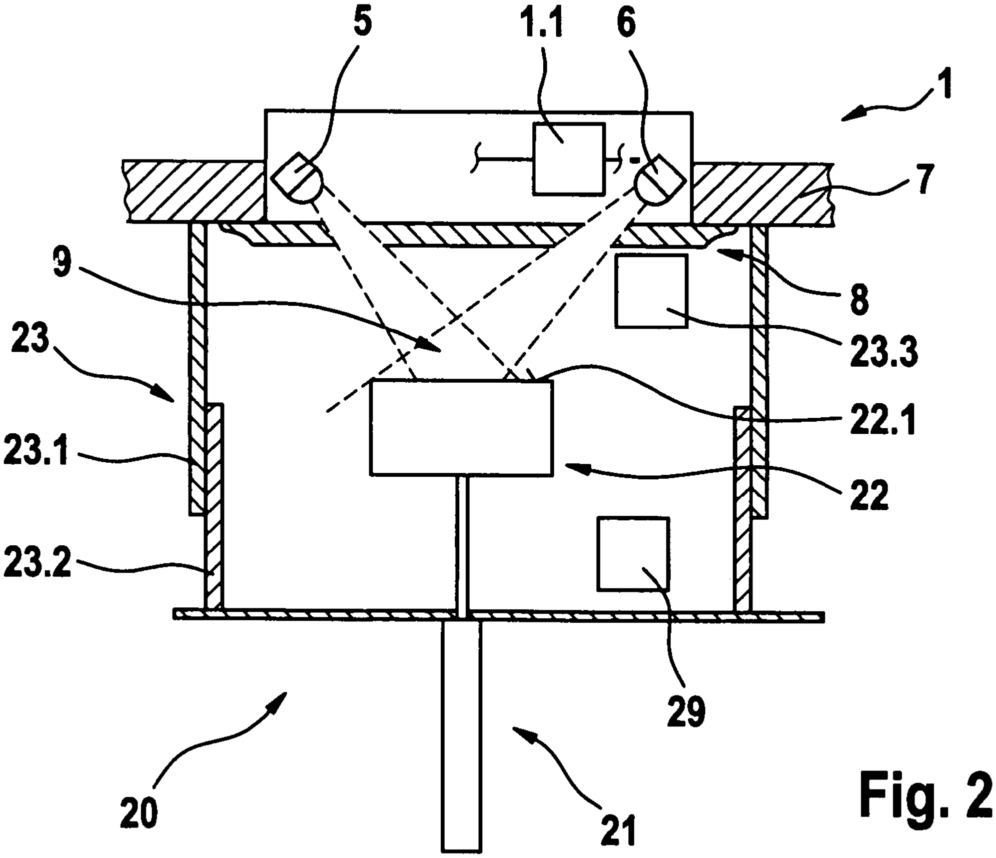
FIG. 2 shows a first exemplary embodiment of testing equipment according to the present invention.

With reference to FIG. 2, testing equipment 20 is described as follows, which is suitable for testing a fire alarm that is installed flush with the ceiling. In such fire alarms 1, as a rule, a labyrinth is dispensed with so that one is able to install them flush with the ceiling 7 of the room. Testing equipment 20 includes a testing pole 21 which, at an end piece, bears an essentially top-shaped design of a range spacer 23. Testing pole 21 is preferably designed as a telescopic tube, so that the length of testing pole 21 may be adapted to spaces of different height. In one variant of an embodiment the testing pole is designed of several parts. The individual parts are expediently able to be connected to one another by screw connections. Depending on the height of the rooms in which the fire alarms 1, that are to be tested, are situated, testing pole 1 is then made up of correspondingly many parts. In one variant of the embodiment, range spacer 23 is also made up of several telescopic-like, extendable parts, so that, with respect to its height, it may be adapted flexibly to testing tasks. On the inside of range spacer 23, and preferably concentrically to it, there is situated a testing element 22. Since the intensity of the radiation reflected from the testing element depends greatly on the surface properties of testing element 22 and its distance from fire alarm 1, surface 22.1 of testing element 22 that faces fire alarm 1 has specified reflective properties. These are expediently determined by the roughness and coloring of this surface 22.1. A specified distance of testing element 22 may also be set in a simple manner by range spacer 23, in that the latter is installed with form locking on shutter 8 of fire alarm 1, and, in this context, lies against room ceiling 7. On account of a telecopic embodiment of range spacer 23, furthermore, a flexible adaptation is possible to different constructions of fire alarms 1. Under ideal measurement conditions, distance and reflection properties of testing element 22 are selected so that, in the case of a fire alarm 1, whose sensitivity is still just at the lowest admissible borderline, the radiation reflected at testing element 22 is still just sufficient for triggering an alarm.

In one relatively simple fire alarm system, a typical measuring procedure using testing equipment 20 according to the present invention, goes as follows. Using testing pole 21 extended for the right working distance, range spacer 23, that is fastened on testing pole 21, is moved in the direction of chamber ceiling 7, and placed onto fire alarm 1 that is attached there. In this context, range spacer 23 takes care of a specified distance between testing element 22 and fire alarm 1. For the duration of the measuring procedure, testing equipment 20 is held in front of fire alarm 1 until an alarm is triggered by the latter. If no alarm is triggered within a predefined test duration, this points to a defect in the fire alarm which, thereupon, has to be more closely investigated, and, if necessary, exchanged.

Such a simple course in the test is not possible in all application cases. Depending on the type of construction (e.g. use of several scattering points, separate measuring paths), the operating manner (analysis of the signal curve versus time for suppression of interferences caused by objects) and the type of fire alarm system, it is under certain circumstances only possible with difficulty to test in a simple way a fire alarm that is flush with the ceiling without a labyrinth, using the testing equipment described. It may rather be necessary to switch fire alarm 1 to a special testing mode (revision mode) for testing the operability. Because of the switchover into the testing mode, the part of the signal processing in fire alarm 1, that is used to detect interfering objects, is switched off. Fire alarm 1 may thereupon be triggered using an object that is brought to the vicinity of the alarm surface. For switchover to the testing mode, various alternatives may be provided, depending on the system. In the case of fire alarms which are connected to a fire alarm center via a bus, one may set in the fire alarm center those fire alarms which are to be tested. The fire alarm center then transmits via the bus a command to the corresponding fire alarms, and this switches them to the testing mode. After completion of testing the alarms, these are switched again to the normal operating mode via a second command. However, for fire alarms operated in direct current line technology, no data exchange between a fire alarm center and the fire alarms is possible. For these fire alarms, therefore, a switching means 1.1, especially a reed contact, is provided in fire alarm 1 itself. If the reed contact is operated by a magnet 23.3 situated at testing equipment 20, fire alarm 1 switches over into testing the mode. If, after switchover into the testing mode, within a predefinable time span, no alarm testing takes place, it is provided that fire alarm 1 change back automatically into normal operating mode.

From this are derived the following courses of the testing using testing equipment 20 designed according to the present invention.

Insofar as the testing of an optical fire alarm is involved, fire alarm 1 is first put into testing mode. This happens, depending on the type of fire alarm system, as was described before, either by a magnet 23.3, situated in testing equipment 20, operating a switching means 1.1, especially a reed contact, situated in fire alarm 1, or by switching fire alarm 1, that is to be tested, by the fire alarm system into the testing mode. Subsequently, testing element 22 of testing equipment 20 is brought into the vicinity of fire alarm 1 in such a way that surface 22.1 of testing element 22 is located in scattering volume 9. This is made possible by an appropriate setting of the length of range spacer 23. An exact adjustment of the length of range spacer 23 may expediently be achieved by making it of two parts 23.1 and 23.2, which are shiftable with respect to each other in a telescopic manner. Testing equipment 20 is then held in front of fire alarm 1 until an alarm is triggered. A fire alarm 1 that cannot be triggered by the testing equipment is regarded as faulty.

Insofar as testing a combined optical/chemical fire alarm 1 is involved, the testing procedure goes as follows.

In a combined optical/chemical fire alarm, fire alarm 1 is triggered in testing mode only when, at the same time, both an increase in the scattered light signal and an increase in the CO measuring value is determined. The CO measuring value points to the presence of a combustion gas, especially of the dangerous gas CO. As was described above, there takes place first a switchover of fire alarm 1 into testing mode. Subsequently, testing equipment 20 is held in front of fire alarm 1. Testing equipment 20 is additionally furnished with a source 29 for combustion gas, especially with a CO gas bottle. Testing element 22 reflects radiation from the region of scattering volume 9. At the same time, CO gas is set free from the CO gas bottle of testing equipment 20, until fire alarm 1 is triggered. A fire alarm 1 which is not triggered within a predefinable time span after the approach of testing element 22 to fire alarm 1, and after liberation of the CO gas, is regarded as being faulty. In the case of combined optical/thermal or optical/chemical/thermal fire alarms, analogous testing procedures are derived.

Figure 3:
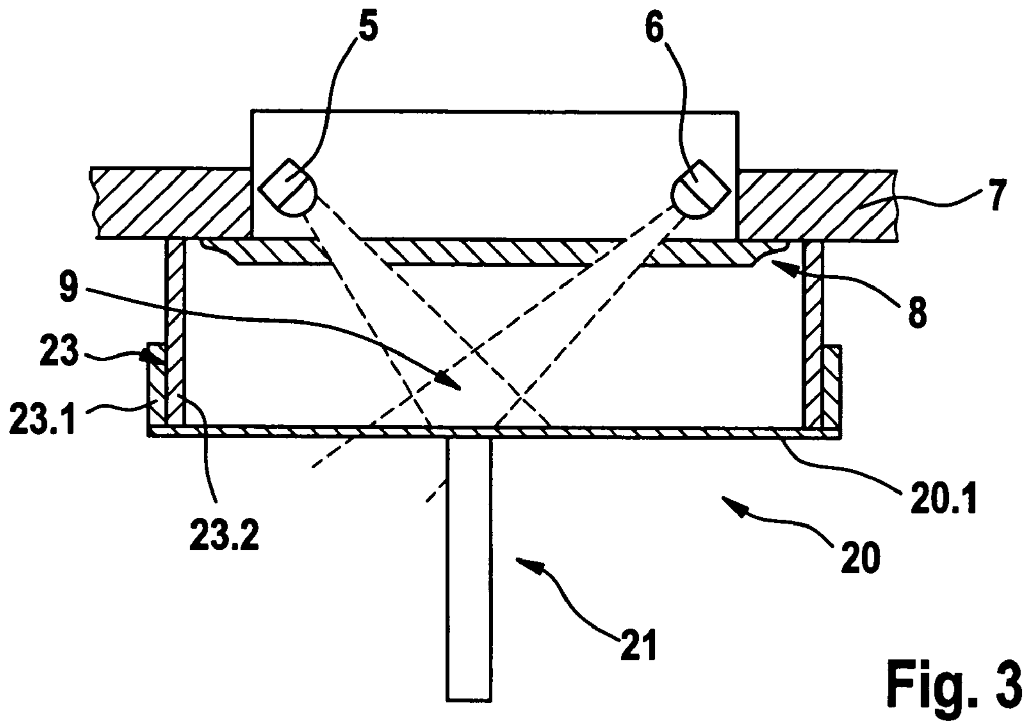
FIG. 3 shows a second exemplary embodiment of testing equipment according to the present invention.

Within the scope of an operability test, in order to be able also to measure the response sensitivity of a fire alarm 1 that is flush with the ceiling, using testing equipment 20, it is necessary to supply to the radiation receptor (photodiode 6) of fire alarm 1 an exactly specified quantity of scattered light. This is possible using a variant of an embodiment of testing equipment 20 described as follows, with reference to FIG. 3. Test equipment 20 includes a flat plate 20.1 which, in practice, forms the floor of range spacer 23. Range spacer 23, in turn, is made of at least two parts, 23.1 and 23.2, which are designed to be telescopically movable. By elongating and shortening range spacer 23, the distance of plate 20.1 from the surface of chamber ceiling 7, or rather to fire alarm 1, may be adjusted. The reflective properties of plate 20.1 are selected in such a way that an exactly specified proportion of the radiation emitted from radiation transmitter (LED 5) to radiation receptor (photodiode 6) is reflected. During the testing procedure, the distance of plate 20.1 from fire alarm 1 is reduced until fire alarm 1 is triggered. If a minimal distance is undershot without triggering of the alarm taking place, one may assume that fire alarm 1 has become too insensitive, and therefore the requirement for detecting a fire is thus no longer sufficient, and that the alarm has to be exchanged or cleaned. Instead of testing equipment 20 having a reflecting plate 20.1 according to FIG. 3, testing equipment 20 having a testing element 22, as shown in FIG. 2 may, of course, also be used for such a test.

However, both the embodiment variants described above have the disadvantage that the reflected radiation intensity depends strongly on the distance of plate 20.1, or testing element 22, from fire alarm 1. In the case of uneven chamber ceilings 7, under certain circumstances, one may be able to set this distance only quite inaccurately.

Figure 4:
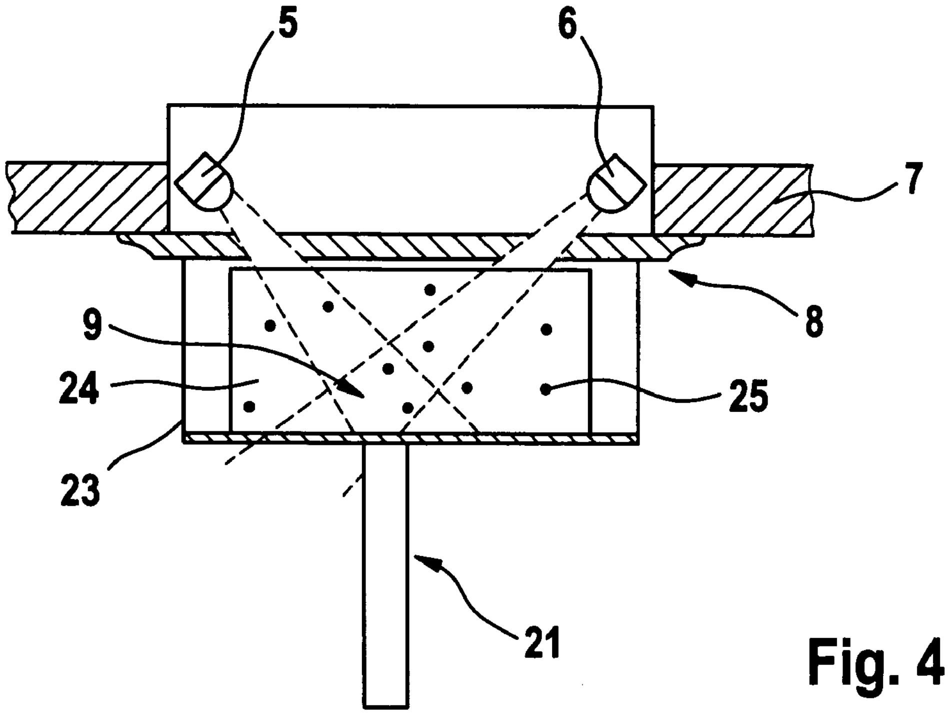
FIG. 4 shows a third exemplary embodiment of testing equipment according to the present invention.

An additional improvement may be achieved by a variant of testing equipment 20 that is shown in FIG. 4. This embodiment variant includes a scattering element 24 situated in range spacer 23. This scattering element is made up of a transparent material, such as a suitable plastic. In scattering element 24, small particles 25 are embedded which act as scattering centers, similar to smoke particles, and which scatter the impinging radiation of radiation emitter 5, so that radiation may reach radiation receptor 6. By varying the particle density and the particle size, in this context, one may simulate a certain smoke density in an advantageous manner. In this embodiment variant of testing equipment 20, the radiation is thus not reflected by a flat surface, but rather, in a similar manner to what happens in a real fire, in which there is smoke in front of fire alarm 1, by particles 25 that are located in the entire scattering volume 9 of fire alarm 1. When testing a fire alarm 1 using testing equipment 20 according to FIG. 4, the response sensitivity of fire alarm 1 may be ascertained by using scattering elements 24 having a different particle density. In one embodiment variant, such a scattering element may be implemented also by a holographic foil.

Figure 5:
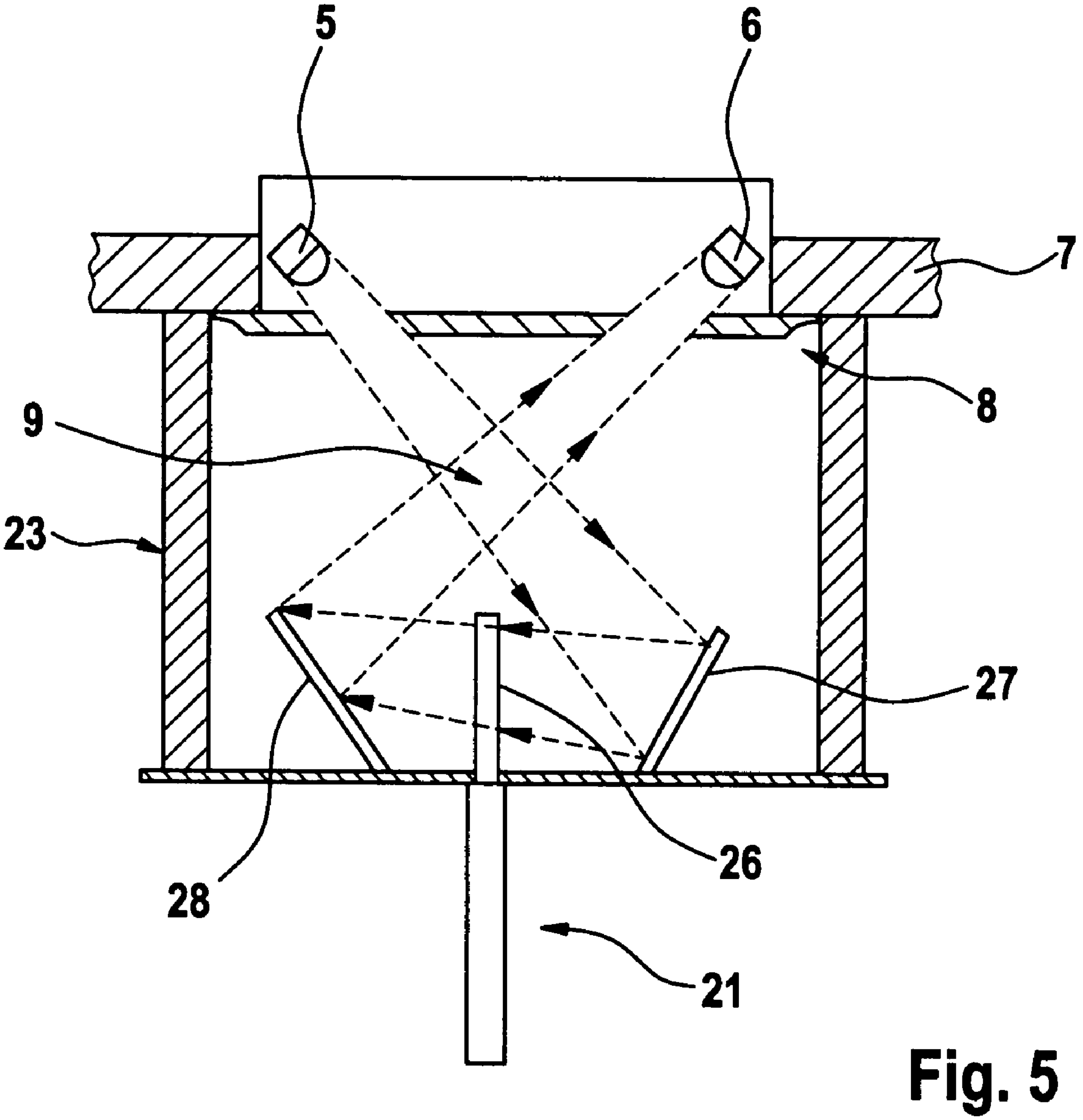
FIG. 5 shows a fourth exemplary embodiment of testing equipment according to the present invention.

A further embodiment variant of testing equipment 20 is shown in FIG. 5. This testing equipment 20 includes deflecting means 27, 28 situated in range spacer 23, as well as damping means 26 situated in the beam path between deflecting means 27, 28. Plate-shaped optical elements are suitable as deflecting means, which may possibly also be coated with a reflecting layer. In one variant of an embodiment of the present invention, deflecting means 27, 28 may also be elements having a curved surface. If one regards the radiation emitter and the radiation receptor as focal points of an ellipse, and deflecting means 27, 28 as components of an ellipsoid, the radiation paths conducted by deflection means 27, 28 are exactly defined and do not cause any scattering losses. In the case of damping means 26, preferably an optical element is involved that has a predefinable absorption coefficient. Damping means 26 are easily exchangeable, so that within the scope of testing a fire alarm 1, damping means having different damping values may be employed. The sensitivity of fire alarm 1 may be tested by an appropriate selection of damping means 26. In a testing process, the radiation of radiation emitter 5 first impinges upon deflecting means 27, and is deflected by it in the direction of damping means 26. After passing through damping means 26, the radiation impinges upon deflecting means 28, and is deflected by it in the direction of radiation receptor 6. The radiation intensity impinging upon the radiation receptor is able to be influenced by the selection of damping means 26.

What is claimed is:

1. A testing equipment (20) for optical fire alarms (1) comprising a testing pole (21), a pot-shaped designed range spacer (23) connected to the testing pole (21), and a reflection means or scattering means (22, 20.1, 24, 25, 27, 28) situated inside of the range spacer (23) for testing the fire alarms.

2. The testing equipment according to claim 1, wherein the range spacer (23) is designed variably with respect to its height.

3. The testing equipment according to claim 1, wherein the range spacer (23) is made up of at least two concentrically positioned parts (23.1, 23.2), which are able to be shifted in a telescopic manner with respect to each other.

4. The testing equipment according to claim 1, wherein the testing pole (21) is developed changeably with respect to its length.

5. The testing equipment according to claim 1, wherein the testing pole (21) is made up of a plurality of parts which are able to be connected to one another.

6. The testing equipment according to claim 1, wherein the testing pole (21) is made up of a plurality of parts which are able to be shifted in a telescopic manner with respect to one another.

7. The testing equipment according to claim 1, wherein a testing element (22) is situated in the range spacer (23) which has at least one surface (22.1) having specified reflective properties.

8. The testing equipment according to claim 1, wherein the floor of the range spacer is developed as a flat plate (20.1) having specified reflective properties.

9. The testing equipment according to claim 1, wherein a scattering element (24) having embedded particles (25) is situated in the range spacer (23).

10. The testing equipment according to claim 1, wherein a holographic element, in particular a holographic foil, is provided as the scattering element.

11. The testing equipment according to claim 1, wherein deflecting means (27, 28) are provided in the range spacer (23), which deflect the radiation emitted by the radiation emitter (5) towards the radiation receptor (6).

12. The testing equipment according to claim 11, wherein damping means (26) are situated in the beam path between the deflecting means (27, 28).

13. The testing equipment according to claim 11, wherein the deflecting means (27, 28) are optical elements having flat planes.

14. The testing equipment according to claim 11, wherein the deflecting means (27, 28) are optical elements having curved surfaces.

15. The testing equipment according to claim 11, wherein the radiation emitter (5), the radiation receptor (6), as well as the deflecting means (27, 28) are aligned in such a way to one another that the radiation emitter (5) and the radiation receptor (6) are situated in the focal points of an ellipsoid, and the deflecting means (27, 28) form parts of the surface of this ellipsoid.

16. The testing equipment according to claim 1, wherein the testing equipment (20) includes a magnet (23.3).

17. The testing equipment according to claim 1, wherein the testing equipment includes a gas bottle (29) having a test gas.

18. A method for testing a fire alarm (1) using a testing equipment according to claim 1, wherein one switches to a testing mode to carry out the testing of the fire alarm (1).

19. The method for testing a fire alarm according to claim 18, wherein when one is testing a combined smoke alarm/gas fire alarm, the fire alarm switched into a testing mode is triggered only when radiation is reflected by the reflective medium or the scattering medium and smoke gas (test gas) is simultaneously liberated.

* * * * *